US012452473B2

(12) United States Patent
Offeman et al.

(10) Patent No.: US 12,452,473 B2
(45) Date of Patent: Oct. 21, 2025

(54) AUGMENTATION OF METADATA IN BROADCAST STREAMS

(71) Applicant: WIDEORBIT LLC, New York, NY (US)

(72) Inventors: William E. Offeman, Redmond, WA (US); Trevan Grant Zosel, Bothell, WA (US); Pamela Morris, Rancho Cordova, CA (US)

(73) Assignee: WIDEORBIT LLC, San Francisco, CA (US)

( * ) Notice: Subject to any disclaimer, the term of this patent is extended or adjusted under 35 U.S.C. 154(b) by 246 days.

(21) Appl. No.: 18/311,752

(22) Filed: May 3, 2023

(65) Prior Publication Data

US 2024/0373078 A1 Nov. 7, 2024

(51) Int. Cl.
*H04N 21/262* (2011.01)
*H04N 21/234* (2011.01)
*H04N 21/235* (2011.01)
*H04N 21/81* (2011.01)

(52) U.S. Cl.
CPC . *H04N 21/26258* (2013.01); *H04N 21/23424* (2013.01); *H04N 21/2353* (2013.01); *H04N 21/812* (2013.01)

(58) Field of Classification Search
CPC ................................................ H04N 21/26258
See application file for complete search history.

(56) References Cited

U.S. PATENT DOCUMENTS

2015/0074732 A1* 3/2015 Green ............... H04N 21/812
 725/93
2021/0306714 A1* 9/2021 Offeman .......... H04N 21/25883

OTHER PUBLICATIONS

Moulding, "A vison of how broadcasters can unify their linear and digital advertising offers", May 11, 2018, downloaded from https://www.v-net.tv/2018/05/11/a-vision-of-how-broadcasters-can-unify-their-linear-and-digital-advertising-offers/, 6 pages.

* cited by examiner

*Primary Examiner* — Michael H Hong
(74) *Attorney, Agent, or Firm* — Seed Intellectual Property Law Group LLP

(57) ABSTRACT

Systems, methods, and articles for augmenting slot metadata for broadcast streams and replacement of content in addressable streams based on the metadata are described herein. The systems disclosed herein are able to augment slots associated with content provided by broadcast streams to include metadata. The augmented slots are used to generate a log, that can be used by at least one of an augmentation system, a broadcast play out provider, and an addressable play out provider to generate one or more playlists for providing content via broadcast streams and addressable streams. The metadata can further be used to alter the content provided by addressable play out providers such that media content provided via the addressable stream and broadcast stream is similar but advertisement content provided via the addressable stream and broadcast stream is different.

19 Claims, 10 Drawing Sheets

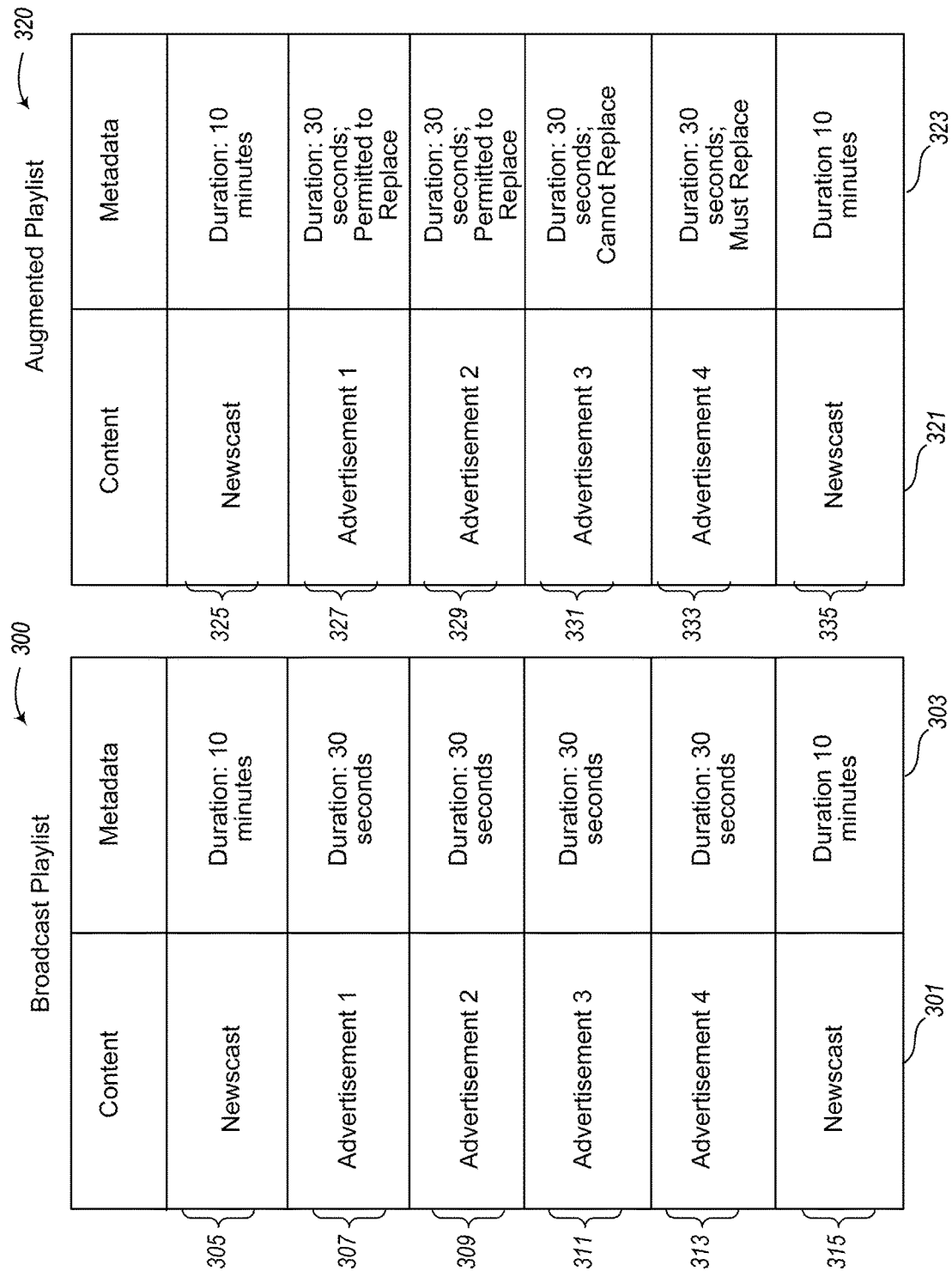

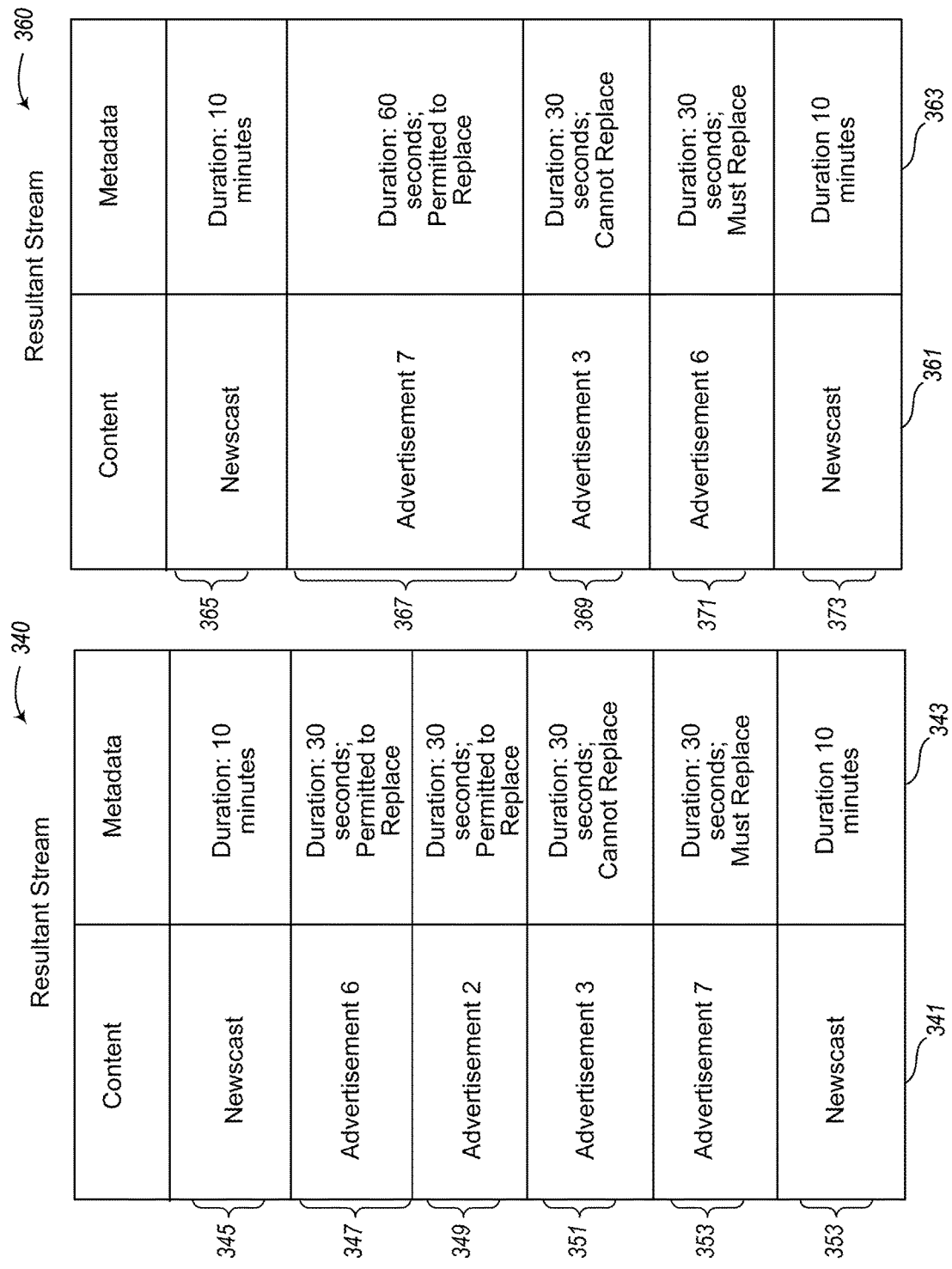

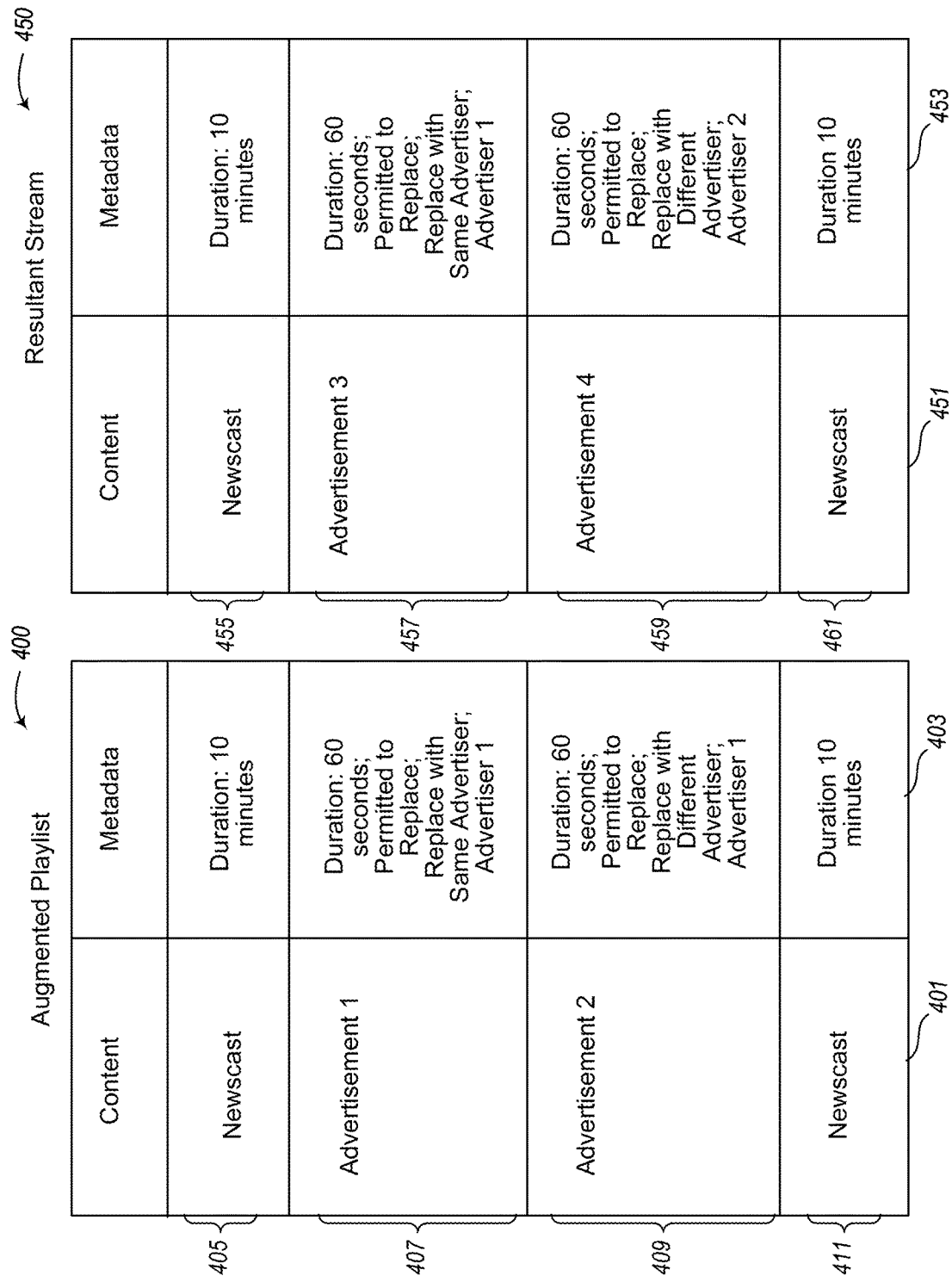

AUGMENTATION OF METADATA IN BROADCAST STREAMS

BACKGROUND

Technical Field

The present disclosure relates the field of computer technology, and more particularly, to computer systems and methods that facilitate the delivery of content to consumers.

Description of the Related Art

Content providers such as radio stations and networks, television stations and networks, and Webcasters provide programming including content which is the subject of programming. Content providers' delivery of content is often via broadcasts or Webcasts (collectively, "mediacasts"). While content providers may employ repeaters and the like, broadcasts are typically limited in range to a geographic region. Additionally, programming may be provided via broadcast streams and webcast streams ("digital streams") that are transmitted at nearly the same time.

Programming often includes advertisements interspersed with the subject matter of the programming. The advertisements may occur in segments or slots sometimes referred to as "ad breaks." Content providers typically sell advertising time to generate revenue to fund operation, as well as generate profits, where the content provider is a commercial entity rather than a nonprofit entity. Advertisers typically offer to buy this advertising time to advertise their products or services. For example, Advertiser A may offer Content Provider B $1000 to buy advertisement time played during Television Show C.

BRIEF SUMMARY

A method of operating a computer system, may be summarized as including: receiving an indication of a plurality of slots offered by a media content provider, each slot being associated with an advertisement placement opportunity of a plurality of advertisement placement opportunities and each slot being assigned at least one advertisement; augmenting each slot of the plurality of slots to include metadata; receiving an indication of a log, the log indicating media content provided by the media content provider and at least one advertisement placement opportunity of the plurality of advertisement placement opportunities; receiving an indication of a broadcast play out provider; receiving an indication of an addressable play out provider; receiving an indication of a first playlist and a second playlist, each playlist including a subset of the plurality of slots; causing a broadcast stream to be generated by the broadcast play out provider based on the first playlist; and causing an addressable stream to be generated by the addressable play out provider based on the second playlist.

The first playlist and the second playlist may include at least one common advertisement placement opportunity, and the at least one common advertisement placement opportunity may be included at the same position in the first playlist and the second playlist.

The at least one common advertisement placement opportunity may have the same duration in the broadcast stream and the addressable stream.

The at least one common advertisement placement opportunity may include different number of slots in the broadcast stream than in the addressable stream.

At least a subset of the broadcast stream and at least a subset of the addressable stream may include the same media content.

The metadata for each respective slot of the plurality of slots may include one or more of: an indication of whether an advertisement assigned to the respective slot must be included in the addressable stream; an indication of whether an advertisement assigned to the respective slot is permitted to be included in the addressable stream; or an indication of whether an advertisement assigned to the respective slot must not be included in the addressable stream.

The metadata may include an indication that the advertisement assigned to the respective slot is permitted to be included in the addressable stream and the metadata may further include one or more of: an indication of a cost of the respective slot; an identifier for the advertisement assigned to the slot; an indication of an advertiser associated with the advertisement; an indication of a creative for the advertisement assigned to the slot; an indication of a category of the advertisement assigned to the slot; or an indication of length of the advertisement assigned to the slot.

The metadata may include an indication that the advertisement assigned to the respective slot must be replaced in the addressable stream and the metadata may further include: an indication of an advertiser associated with the advertisement; and an indication of whether the advertisement must be replaced by another advertisement associated with the advertiser.

Receiving the first playlist and the second playlist may include: generating the first playlist for a broadcast stream based on the log, the subset of the plurality of slots, and the metadata associated with each slot of the subset of the plurality of slots; and generating the second playlist for an addressable stream based on the log, the subset of the plurality of slots, and the metadata associated with each slot of the subset of the plurality of slots.

Causing the broadcast stream to be generated may further include causing the first playlist to be transmitted to the broadcast play out provider. Causing the addressable stream to be generated may further include causing the second playlist to be transmitted to an addressable stream provider.

A system used to generate playlists for broadcast streams and addressable streams may comprise: at least one processor; and at least one memory coupled to the at least one processor, the at least one memory having computer-executable instructions stored thereon that, when executed by the at least one processor, cause the system to: receive an indication of a plurality of slots offered by a media content provider, each slot being associated with an advertisement placement opportunity of a plurality of advertisement placement opportunities and each slot being assigned at least one advertisement; augment each slot of the plurality of slots to include metadata; receive a log, the log indicating media content provided by the media content provider and at least one advertisement placement opportunity of the plurality of advertisement placement opportunities; receive an indication of a broadcast play out provider; receive an indication of an addressable play out provider; receive an indication of a first playlist and a second playlist, each playlist including a subset of the plurality of slots; cause a broadcast stream to be generated by the broadcast play out provider based on the first playlist; and cause an addressable stream to be generated by the addressable play out provider based on the second playlist.

A non-transitory processor-readable storage medium that stores at least one of instructions or data, the instructions or data, when executed by at least one processor, may cause the at least one processor to: receive an indication of a plurality of slots offered by a media content provider, each slot being associated with an advertisement placement opportunity of a plurality of advertisement placement opportunities and each slot being assigned at least one advertisement; augment each slot of the plurality of slots to include metadata; receive a log, the log indicating media content provided by the media content provider and at least one advertisement placement opportunity of the plurality of advertisement placement opportunities; receive an indication of a broadcast stream associated with the media content provider; receive an indication of an addressable stream associated with the media content provider; receive an indication of a first playlist and a second playlist, each playlist including a subset of the plurality of slots; cause the first playlist to be transmitted to a broadcast play out provider, the broadcast play out provider being able to generate a broadcast stream based on the first playlist; and cause the second playlist to be transmitted to an addressable play out provider, the addressable play out provider being able to generate an addressable stream based on the second playlist.

A method of operating a digital media content provider computer system, may be summarized as comprising: receiving a playlist, the playlist including an indication of media content and an indication of a plurality of advertisement placement opportunities; and for each respective advertisement placement opportunity of the plurality of advertisement opportunities: identifying one or more slots included in the plurality of advertisement placement opportunities; and for each respective slot of the one or more slots: identifying metadata included in the playlist for the respective slot; identifying a first advertisement assigned to the respective slot; determining whether the first advertisement is permitted to be replaced based on the metadata; and based on the determining, replacing the first advertisement with another advertisement.

The metadata included in the playlist for each respective slot may comprise one or more of: an indication that the first advertisement assigned to the respective slot must be replaced with a second advertisement; an indication that the first advertisement assigned to the respective slot must not be replaced with a second advertisement; and an indication that the first advertisement assigned to the respective slot is permitted to be replaced with a second advertisement.

The metadata included in the playlist for each respective slot may comprise one or more of: an indication of a rate for the first advertisement assigned to the respective slot; an indication of a length of the respective slot; an indication of a creative associated with the first advertisement assigned to the respective slot; and an indication of a category of the first advertisement assigned to the respective slot.

Replacing the first advertisement may further include: identifying additional metadata included in the playlist for a second slot of the one or more slots; identifying a second advertisement assigned to the second slot; determining whether the second advertisement is permitted to be replaced based on the additional metadata; and based on the determining: combining the first slot and the second slot; and replacing the first advertisement and the second advertisement with a third advertisement.

Replacing the first advertisement may further include: splitting the first slot into two or more slots; and assigning an advertisement to each slot of the two or more slots.

Replacing the first advertisement may further include: identifying additional metadata included in the playlist for the respective slot; and replacing the first advertisement with another advertisement based on the additional metadata.

The additional metadata may further include one or more of: an indication of whether the advertisement must be replaced by another advertisement associated with the advertiser associated with the advertisement; or an indication of whether the advertisement must not be replaced by another advertisement associated with the advertiser associated with the advertisement.

The method of operating a digital media content provider computer system may further include: causing a stream to be transmitted to one or more devices based on the received playlist; and wherein replacing the first advertisement with another advertisement occurs in real-time in conjunction with the transmission of the stream.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

FIG. 3A is a table diagram of an example broadcast playlist, according to various embodiments described herein.

FIG. 3B is a table diagram of an augmented playlist generated based on the broadcast playlist 300, according to various embodiments described herein.

FIG. 3C is a table diagram of a first resultant stream generated based on the augmented playlist, according to various embodiments described herein.

FIG. 3D is a table diagram of a second resultant stream generated based on the augmented playlist, according to various embodiments described herein.

FIG. 4A is a table diagram of a second augmented playlist, according to various embodiments described herein.

FIG. 4B is a table diagram of a fourth resultant stream generated based on the second augmented playlist, according to various embodiments described herein.

DETAILED DESCRIPTION

Figure 1:
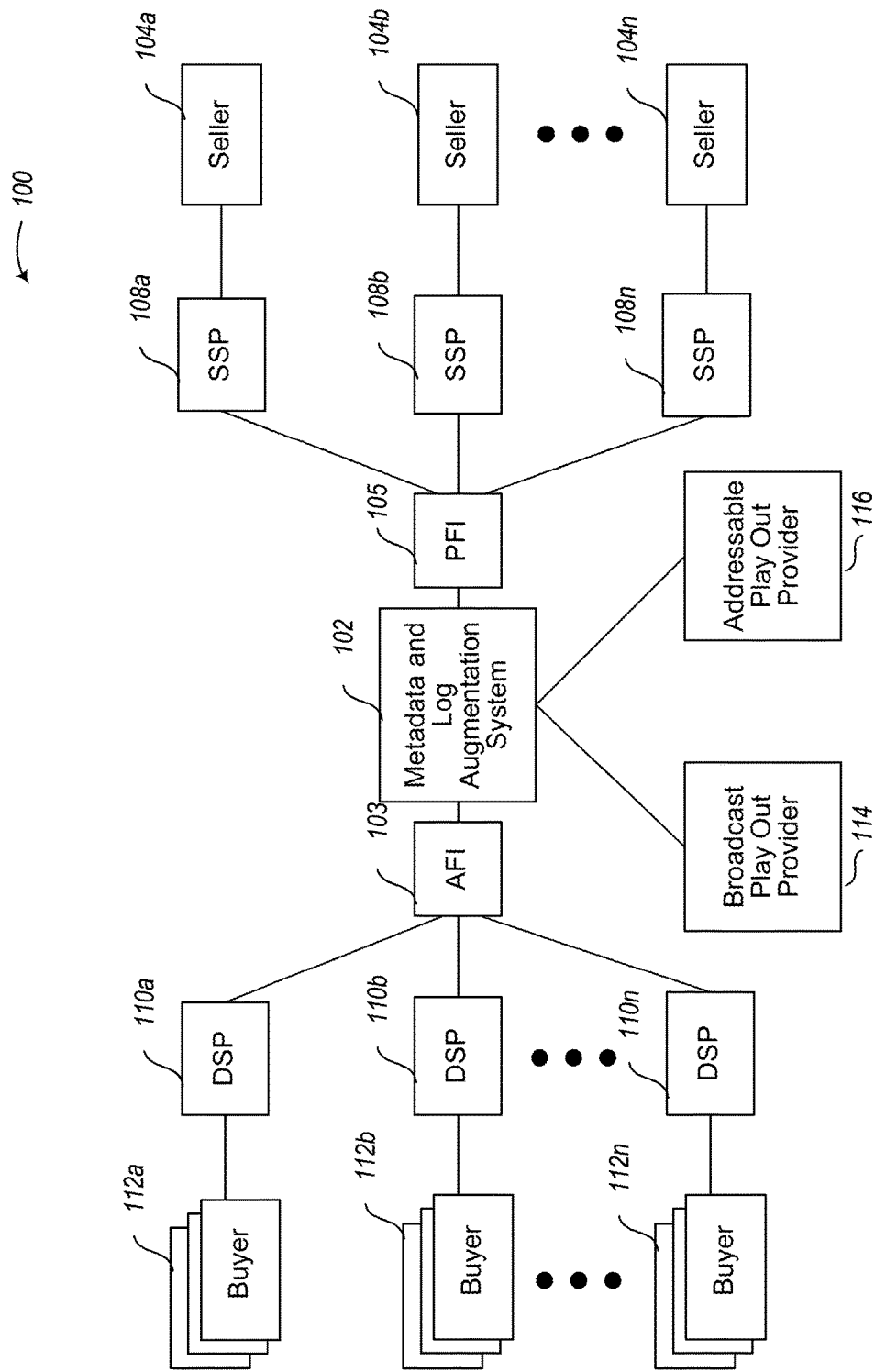
FIG. 1 shows an example networked environment according to one illustrated implementation in which various apparatus, methods and articles described herein may operate.

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

One or more implementations of the present disclosure are directed to computer-implemented systems and methods of automating and optimizing the buying and selling of advertisements, or "spots." Buying and selling television, radio or digital advertising has traditionally been a highly manual process and requires many participants to execute orders. Layering in audience and pricing data adds another level of complexity to the campaign execution workflow.

Media content provided by media content providers include advertisement placement opportunities. Each advertisement placement opportunity includes one or more slots, which are periods of time within which an advertisement spot can be placed.

In conventional workflows, an advertiser, or "buyer," contacts multiple networks, or "media content providers," to negotiate and purchase spots. The advertiser may negotiate a price with each of these providers, only to find out later on that one or more of the media content providers have rejected their offers, resulting in wasted time, effort, and, in the case of negotiations and purchases that use computer systems or automation, computer resources. An advertisement is "cleared" when a buyer's offer to buy a spot is accepted by a seller, or media content provider and the buyer's advertisement is published in the spot.

Furthermore, mediacasts that provide the same or similar media content but are aired in different locations and provided by different broadcast streams and webcast streams, may not be able to include the same advertisements across streams and locations. For example, media content that is provided via a broadcast stream in Washington state may have different advertisements than the same media content that is provided via a digital stream. In another example, media content provided via a broadcast stream in Washington state may have different advertisements than the same media content that is provided via a digital or broadcast stream in Illinois.

Conventional systems generate a separate "log" for each stream used to provide media content. Each log includes a large amount of data used to provide media content and advertisements assigned to the media content via a broadcast stream or digital stream, such as: data indicating the spots for a given air date; data indicating the slots for a given air date; data indicating advertisement material for the given air date; data indicating the media content associated with slots and spots; and other data related to media content and advertisement content scheduled to air on a given air date. As a result, a new log must be generated for each stream because a log generated for a broadcast stream may include advertisements or other content that cannot be included in a digital stream, or vice versa. Furthermore, when a conventional log includes content that cannot be included in a stream, the provider of the stream must replace that content with a blank screen, a message that content will resume after a period of time, etc., instead of media or advertisement content.

Implementations of the present disclosure are directed to computer-implemented systems and methods for augmenting slots with metadata. The augmentation of the slots allow a single log to be used to generate playlists for broadcast streams and digital streams. Furthermore, the augmented slots are able to be manipulated by the stream provider to include different advertisement spots compared to the original advertisement spots assigned to the slots, such as in the case where a certain advertisement spot cannot be shown by a stream provider.

Such implementations are thus able to improve the functioning of computer or other hardware, such as by reducing the dynamic display area, processing, storage, and/or data transmission resources needed to perform a certain task, thereby enabling the task to be permitted by less capable, capacious, and/or expensive hardware devices, and/or be performed with lesser latency, and/or preserving more of the conserved resources for use in performing other tasks. For example, by augmenting slots such that only one log is created, multiple playlists are able to be generated from the log and transmitted to each stream. Each playlist includes less data than the log because the log includes instructions for each stream provider, whereas each playlist includes instructions for the stream provider to which it is transmitted. As a result, transmitting playlists rather than entire logs results in the use of fewer network resources, such as bandwidth, and may decrease the latency of the transmission of each playlist. Additionally, because playlists include less data than a log, the computing systems of a streaming provider are able to store the playlist with less memory than would be needed to store a log, thus freeing memory for use by other operations of the streaming provider computer systems.

Furthermore, such implementations are able to improve the technical field of mediacast streaming. In conventional systems, a stream provider that encounters an advertisement spot that it is unable to air, such as when the stream provider does not have the rights to air the advertisement, must display a blank screen, a message that content will resume shortly, etc. Conventional systems are unable to determine whether advertisement spots can be replaced with other advertisements, nor can they determine whether slots can be combined or split into smaller slots to accommodate a variety of advertisement spots. However, implementations of the present disclosure are able to cause this information to be provided to stream providers by augmenting slots with metadata that includes information detailing whether spots must be replaced, is permitted to be replaced, or must not be replaced. The metadata can also be used by the stream provider to combine or split slots in order to select an advertisement spot to replace a spot that is able to be replace. As a result, implementations of the present disclosure improve the technical field of mediacast streaming by allowing streaming providers to adjust the advertisement spots assigned to slots that are augmented with metadata.

Additionally, in some conventional systems, a broadcast play out provider receives a log or playlist, and transmits the entire log or playlist to an addressable play out provider. However, in order to ensure that the addressable play out provider only airs advertisements that it is able to air, the addressable play out provider or the broadcast play out provider must create a new playlist, thus expending computing resources of the broadcast play out provider or addressable play out provider, such as the processing power and memory needed to generate the new playlist. In contrast, implementations of the present invention are able to generate playlists that can be used by both the broadcast play out provider and the addressable play out provider, thus ensuring that the broadcast play out provider does not have to expend computing resources for creating the new playlist, because the broadcast play out provider can transmit the playlist it receives directly to the addressable play out provider, and the addressable play out provider is able to use the playlist without any additional processing.

In at least some implementations, buyers and sellers can trade mediacast (e.g., broadcast, Webcast) advertisement inventory (e.g., direct or programmatically) at local, national, and/or worldwide levels. The types of media traded via may simultaneously include numerous types of media, including TV, cable, satellite, radio, outdoor, display, digital, print, etc. Such programmatic advertising implements data-driven automation of audience-based advertising operations which inverts the industry standard in which marketers rely on show ratings to determine desirable audiences for the marketers' advertisements.

In at least some implementations, the metadata and log augmentation system ("the augmentation system") disclosed herein interfaces with demand side platforms (DSPs) that assist buyers in making offers to sellers. Sellers enjoy seamless transaction workflow for getting advertisements from proposal, to publishing, and to billing that delivers a significant reduction in time spent on reconciliation and "make-goods" and streamlines processes for creative management and revenue management across direct and programmatic sales channels. The advertiser-facing interface facilitates creative placement and reviewing for the buy side, and may have transcoding and approval tools for the sell side. For example, in some implementations, once an advertisement transaction is approved, the advertiser-facing interface sends the advertisement directly to a broadcaster's traffic system.

In some implementations, the augmentation systems disclosed herein automate aspects of billing, reconciliation, and creative execution. In some implementations, the augmentation systems may be integrated with advertisement management software and sales and traffic management systems.

FIG. 1 shows an example networked environment 100 according to one illustrated implementation in which various apparatus, methods and articles described herein may operate. The environment 100 includes a metadata and log augmentation system 102 (an "augmentation system 102"), an advertiser-facing interface (AFI) 103, a media content provider-facing interface (PFI), a number of sellers or content providers 104A-104N (collectively 104), a number of seller side platforms (SSPs) 108A-108N (collectively 108), a number of demand side platforms (DSPs) 110A-110N (collectively 110), a number of buyers 112A-112N (collectively 112), such as advertisers or agencies, at least one broadcast play out provider 114, and at least one addressable play out provider 116 (or an "addressable play out provider"), all communicatively coupled by one or more networks or other communications channels. The various components of the environment may be distributed or integrated in any number of ways. For example, in at least some implementations, two or more of the DSPs 110, AFI 103, augmentation system 102, and PFI 105 may be integrated into a single platform provided by one or more entities.

In the example implementation, a broadcast play out provider 114 is an entity that transmits a media content to viewer devices by broadcasting a stream of media content. The broadcast play out provider 114 receives a playlist that indicates media content, advertisement spots, metadata for slots, and an order for streaming the content and advertisements included in the playlist and uses the playlist to transmit the broadcast stream. In some embodiments, the broadcast play out provider 114 generates, alters, etc., the broadcast stream. The broadcast play out provider 114 may also transmit the playlist to an addressable play out provider, such as the addressable play out provider 116. In some embodiments, the broadcast play out provider 114 obtains media content, advertisement content, or some combination thereof to as part of generating or altering a stream.

In the example implementation, the addressable play out provider 116, or "digital stream provider," "stream provider," "play out system," "addressable play out system," "addressable stream provider," etc., is an entity that transmits media content to viewer devices by generating and transmitting a stream of media content via a computer network, such as the Internet. The stream of content may be generated by obtaining media content and advertisement content from various media content providers and advertisement content providers based on a playlist or log received by the addressable play out provider 116. The addressable play out provider 116 receives a playlist that indicates media content, advertisement spots, metadata for slots, and an order for streaming the content and advertisements included in the playlist, and uses the playlist to transmit the digital stream. In some embodiments, the addressable play out provider 116 uses the playlist to generate a stream, alter a stream, etc. The addressable play out provider 116 may use the metadata included in the playlist to determine whether one or more advertisements spots are permitted to be replaced with other advertisement spots. In some embodiments, the addressable play out provider 116 obtains media content, advertisement content, or some combination thereof, from one or more media content providers as part of generating or altering a stream.

In the example implementation, the augmentation system 102 generates a log based on information indicating advertisement spots assigned to media content provided by sellers 104. The augmentation system 102 augments the slots included in the log with metadata that indicates attributes of the slots, such as information related to the advertisement spot assigned to a slot, whether the advertisement spot must air, must not air, or is permitted to air, or other data indicating the attributes of a slot. The augmented log is used to generate at least one playlist that is caused to be transmitted to a broadcast play out provider 114 and addressable play out provider 116.

In an exemplary embodiment, broadcast play out providers and addressable play out providers use the augmented log and generated playlists to provide content to viewers. In such embodiments, stream providers provide the same, or substantially similar, media content to viewers at nearly the same time, but may provide different advertisement content to viewers. For example, while multiple stream providers may both provide a newscast to viewers, one or more stream providers may provide the newscast in a different language than others, may include other content within the newscast, or may make other changes to the newscast. Additionally, in some embodiments, some stream providers allow users to pause, rewind, or otherwise manipulate playback of the provided content. In such embodiments, although the content would not be viewed at the same time by users of different stream providers, the stream providers may still be caused to provide content in the order specified by the playlist used by each of the stream providers.

Figure 2:
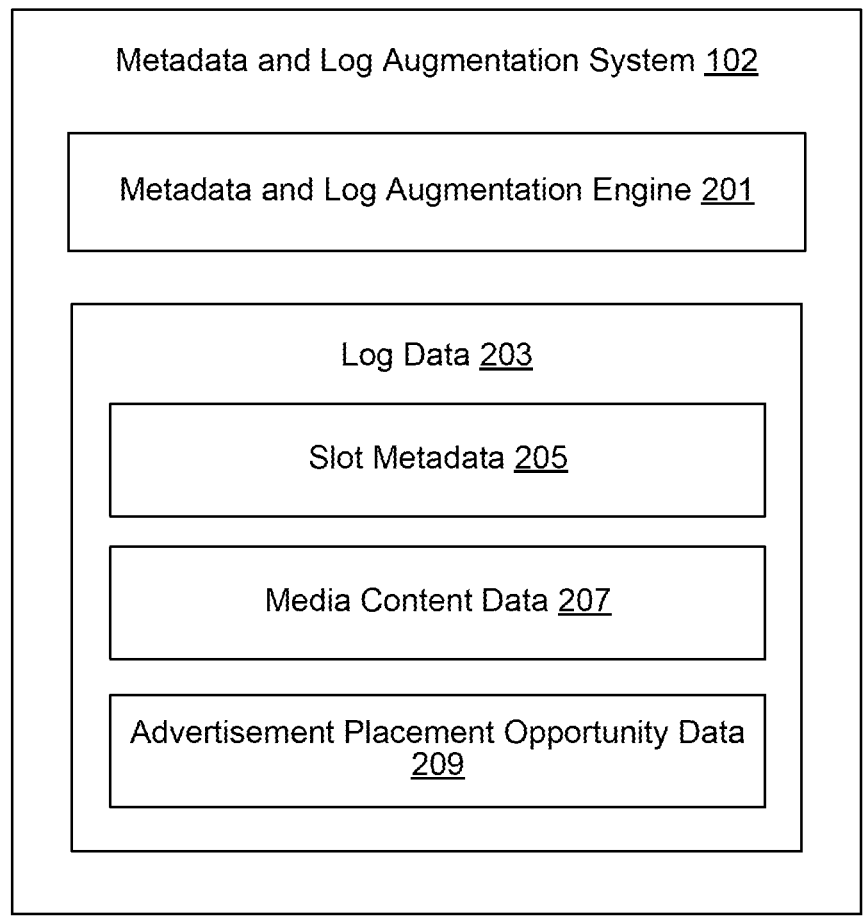
FIG. 2 is a block diagram showing sample elements of a metadata and log augmentation system, according to one illustrated implementation.

FIG. 2 is a block diagram showing sample elements of a metadata and log augmentation system 102 (an "augmentation system 102"), according to one illustrated implementation. The augmentation system 102 includes a metadata and log augmentation engine 201 (an "augmentation engine 201") and log data 203.

The augmentation engine 201 augments slots specified in a log to include metadata based on the log data 203. The augmentation engine 201 determines the metadata used to augment the slot based on one or more of: media content associated with slots; advertisement spots assigned to the slots; one or more attributes of the advertisement spots, such as a length of the advertisement spot, an indication of an advertiser associated with the advertisement spot, an indication of one or more requirements for airing the advertisement spot, or other attributes of an advertisement spot; one or more attributes of a media content provider associated with the media content, such as an indication of the media content provider, an indication of one or more requirements for airing advertisement spots during the media content, a location of the media content provider, or other attributes of the media content provider; and other data related to a slot, media content provider, advertisement placement opportunity, or advertisement spot. The augmentation engine 201 may be used to generate one or more of the playlists 300, 320 and 400 described below with respect to FIGS. 3A, 3B, and 4A, respectively. Additionally, the augmentation engine 201 may use one or more of the processes 500, 600, or 700 described below with respect to FIGS. 5, 6, and 7, respectively.

The log data 203 includes data related to a log and data related to the augmentation of the log by the augmentation system 102. The log data 203 includes slot metadata 205, media content data 207, advertisement placement opportunity data 209, and other data related to logs. The slot metadata 205 includes metadata for the slot, such as: an indication of whether an advertisement assigned to the slot cannot be replaced, an indication of whether an advertisement assigned to the slot can be replaced, an indication of whether an advertisement assigned to the slot is permitted to be replaced. an indication of one or more attributes of the advertisement assigned to the slot, an indication of one or more attributes of an advertiser associated with the advertisement assigned to the slot, an indication of one or more attributes of the media content provider associated with the media content, an indication of one or more attributes of the advertisement placement opportunity associated with the slot, an indication of one or more attributes of the slot, an indication of a selected language for advertisements assigned to the slot, or other data related to a slot, media content provider, advertisement placement opportunity, advertiser, or advertisement. The media content data 207 includes data describing one or more attributes of the media content, such as: an indication of a number of advertisement placement opportunities for the media content; an indication of the media content provider associated with the media content; an indication of the length of the media content; an indication of the time at which the advertisement placement opportunities occur within the media content; or other attributes of the media content. The advertisement placement opportunity data 209 includes data related to each advertisement placement opportunity included in the log, such as: an indication of the length of the advertisement placement opportunity; an indication of one or more slots associated with the advertisement placement opportunity; an indication of one or more advertisements assigned to the advertisement placement opportunity; an indication of the time that the advertisement placement opportunity is scheduled to occur; an indication of media content associated with the advertisement placement opportunity; or an indication of other attributes of the advertisement placement opportunity.

FIG. 3A is a table diagram of an example broadcast playlist 300, according to various embodiments described herein. The broadcast playlist 300 includes a content column 301 and a metadata column 303. Each row of the broadcast playlist 300, such as rows 305, 307, 309, 311, 313, and 315, represent a slot to which an advertisement is assigned or media content that is provided. The content column 301 includes data indicating content that is included in the playlist. The metadata column 303 includes data indicating metadata for the corresponding content indicated in the content column 301. In some embodiments an augmentation system, such as the augmentation system 102, generates the broadcast playlist 300 based on a log. Although the broadcast playlist 300 includes a content column 301 and metadata column 303, embodiments are not so limited, and the broadcast playlist 300 may include additional data, such as data indicating a time at which the content indicated by the content column 301 airs, data indicating a media content provider that provides the content, or other data related to a playlist. One or more of the rows 307, 309, 311, and 313 may be associated with an advertisement placement opportunity associated with media content indicated in at least one of the rows 305 and 315.

In some embodiments, a broadcast play out provider, such as the broadcast play out provider 114 described above in connection with FIG. 1, that receives the playlist 300, uses the playlist 300 to provide content to viewers in the order indicated by the playlist. For example, the broadcast play out provider would first broadcast the newscast indicated at row 305 for ten minutes. After the newscast airs, the broadcast play out provider broadcasts the advertisement indicated in row 307 for thirty seconds and continues broadcasting the content indicated by rows 309, 311, 313, and 315 in the order indicated by the playlist. In some embodiments, the broadcast playlist includes the augmented metadata included in the augmented playlist 320 described below. In such embodiments, the broadcast play out system may use the augmented metadata in a similar manner to the addressable play out system, as described below in connection with FIGS. 3B, 3C, 3D, 3E, 4A, and 4B.

FIG. 3B is a table diagram of an augmented playlist 320 generated based on the broadcast playlist 300, according to various embodiments described herein. The augmented playlist 320 includes a content column 321 and metadata column 323. The content column 321 and metadata column 323 may be similar to the content column 301 and metadata column 303 described above in connection with FIG. 3A. The metadata column 323 may include different, additional, fewer, or otherwise augmented metadata when compared to the metadata include in the metadata column 303, such as, for example, metadata indicating whether one or more advertisements are permitted to be replaced, whether one or more slots are permitted to be altered, or any other metadata that may be used in a playlist provided to a play out provider. The augmented playlist 320 is a playlist that is created based on a broadcast playlist, such as the broadcast playlist 300. The augmented playlist 320 includes the same, or substantially similar, media content as the broadcast playlist 300 but may include different advertisements than those included in the broadcast playlist 300. For example, the augmented playlist 320 may include media content in a different language, with different music, different subtitles, different announcers or performers, or other differences than the language, music, subtitles, announcers, performers, etc., included in the broadcast playlist 300.

The augmented playlist 320 is generated by an augmentation system, such as the augmentation system 102 described above in connection with FIG. 1, an addressable media content provider, a broadcast media content provider, any other entity with access to the broadcast playlist 300, or some combination thereof. In some embodiments, the augmented playlist 320 is generated by the augmentation system 102. For example, the augmentation system 102 may generate the augmented playlist 320 based on data received from one or more buyers or sellers, such as the buyers 112 and sellers 104 described above in connection with FIG. 1.

In some embodiments, the augmented playlist 320 is generated by a digital media content provider (also referred to as an "addressable media content provider"), such as one or more of the sellers 104 described above in connection with FIG. 1. The digital media content provider may generate the augmented playlist 320 based on a broadcast playlist, such as the broadcast playlist 300. In some embodiments, the digital media content provider receives a broadcast playlist from one or more of a broadcast media content provider, such as one of the sellers 104 described above in connection with FIG. 1, an augmentation system, such as the augmentation system 102, a broadcast play out provider, such as the broadcast play out provider 114, an addressable play out provider, such as the addressable play out provider 116, or another entity that has access to an indication of a broadcast playlist.

The augmented playlist 320 includes rows that indicate the media content and advertisement content indicated by the playlist, such as rows 325, 327, 329, 331, 333, and 335. Rows 325 and 335 are similar to rows 305 and 315, described above in connection with FIG. 3A. Rows 327 and 329 indicate that the advertisements indicated by rows 307 and 309, respectively, in the broadcast playlist 300 are permitted to be replaced. Likewise, row 331 indicates that the advertisement indicated by row 311 in the broadcast playlist 300 cannot be replaced. Furthermore, row 333 indicates that the advertisement indicated by row 313 in the broadcast playlist 300 must be replaced.

Figure 3E:
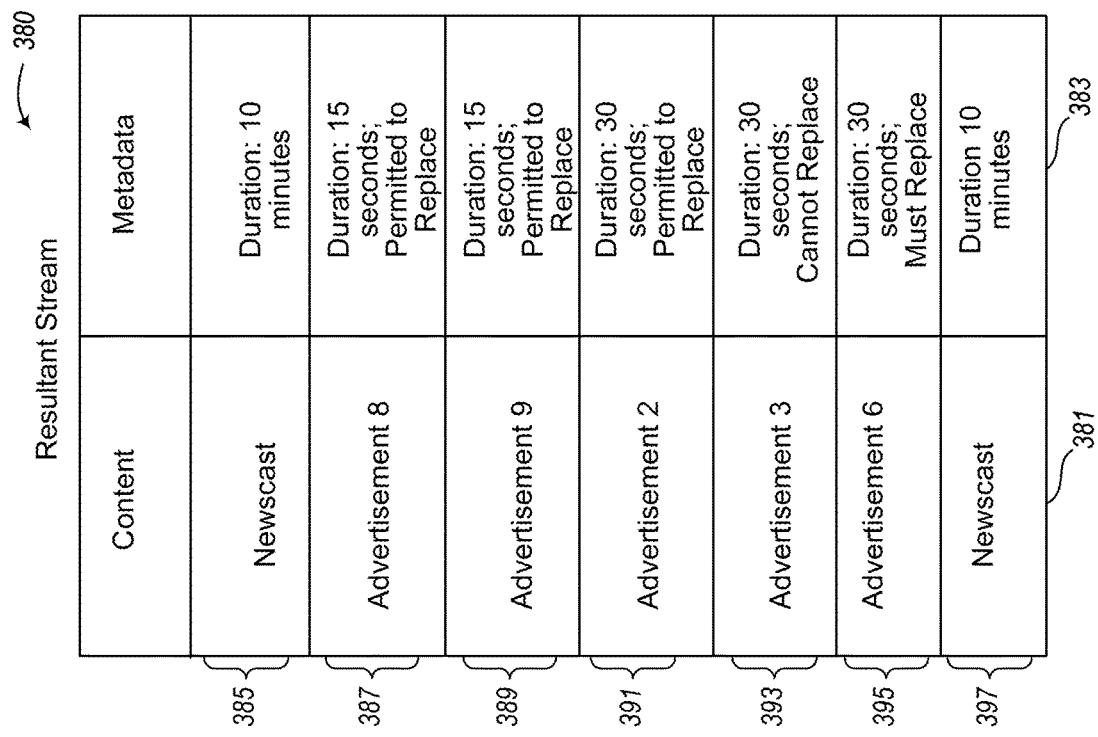
FIG. 3E is a table diagram of a third resultant stream generated based on the augmented playlist, according to various embodiments described herein.

The augmented playlist 320 is transmitted to a play out provider, such as an addressable play out provider, that generates, augments, or otherwise creates or alters a stream of media content based on the augmented playlist. FIGS. 3C, 3D, and 3E are each examples of a resultant stream created by a play out provider based on at least the augmented playlist 320.

FIG. 3C is a table diagram of a first resultant stream 340, generated based on the augmented playlist 320, according to various embodiments described herein. The first resultant stream 340 is an example table representation of the media and advertisement content that are included in a stream generated by a play out system that receives the augmented playlist 320. The first resultant stream 340 includes a content column 341 and metadata column 343, which are similar to the content column 321 and metadata column 323 described above in connection with the augmented playlist 320. In some embodiments, augmenting or otherwise altering a stream based on the augmented playlist to obtain the resultant stream occurs in "real-time." For example, a play out system may use the augmented playlist to determine whether content should be replaced, whether slots should be altered, or whether other alterations should be made to the stream, while the stream is being transmitted to user devices. In some embodiments, the play out system's generation of the resultant stream includes selecting, receiving, obtaining, or otherwise identifying advertisement content, media content, or any other content, that will be included in the resultant stream, such as by receiving the content from one or more content providers, such as a media content provider or advertisement content provider. In some embodiments, the play out system's generation of the resultant stream includes changing one or more slots indicated by the augmented playlist 320 based on metadata included in the one or more slots.

The first resultant stream 340 includes rows 345, 347, 349, 351, and 353, of which rows 345, 349, 351, and 353 are similar to rows 325, 331, 333, and 335 described above in connection with the augmented playlist 320. Rows 347 and 353 indicate that the advertisements included in the thirty second slots indicated by rows 327 and 333, respectively, of the augmented playlist 320 have been replaced in the resultant stream transmitted to devices. Likewise, rows 349 and 351 indicate that the advertisement included in the thirty second slots indicated by rows 329 and 331, respectively, of the augmented playlist 320 have not been replaced.

FIG. 3D is a table diagram of a second resultant stream 360 generated based on the augmented playlist 320, according to various embodiments described herein. The second resultant stream 360 may be generated in a similar manner to the first resultant stream 340, and the content column 361 and metadata column 363 may be similar to the content column 341 and metadata column 343 of the first resultant stream 340.

The second resultant stream 360 includes rows 365, 367, 369, 371, and 373, of which rows 365, 369, 371, and 373 are similar to rows 325, 331, 333, and 335 described above in connection with the augmented playlist 320. Row 367 indicates that the two thirty second slots indicated by rows 327 and 329 of the augmented playlist 320 have been combined to create a single sixty second slot. In some embodiments, the play out system combines slots in real-time as the resultant stream is transmitted to user devices.

FIG. 3E is a table diagram of a third resultant stream 380 generated based on the augmented playlist 320, according to various embodiments described herein. The third resultant stream 380 may be generated in a similar manner to the first resultant stream 340, and the content column 381 and metadata column 383 may be similar to the content column 341 and metadata column 343 of the first resultant stream 340.

The third resultant stream 380 includes rows 385, 387, 389, 391, 393, 395, and 397, of which rows 385, 391, 393, 395, and 397 are similar to rows 345, 349, 351, 353, and 355 described above in connection with the first resultant stream 340. Rows 387 and 389 indicate that the thirty second slots indicated by row 327 of the augmented playlist 320 has been split into two fifteen second slots that each are assigned a different advertisement. In some embodiments, the play out system splits slots in real-time as the resultant stream is transmitted to user devices.

FIG. 4A is a table diagram of a second augmented playlist 400, according to various embodiments described herein. The second augmented playlist 400 may be generated in a similar manner to the augmented playlist 320, and the content column 401 and metadata column 403 may be similar to the content column 321 and metadata column 323, respectively.

The second augmented playlist 400 includes rows 405, 407, 409, and 411, of which rows 405 and 411 are similar to rows 325 and 335 described above in connection with the augmented playlist 320. Row 407 indicates a play out system will cause an advertisement that is sixty seconds long and is permitted to be replaced to be included in a stream transmitted to user devices after the newscast indicated by row 405. Row 407 also indicates that the advertiser for the advertisement currently assigned to the slot represented by row 407 is "Advertiser 1," and that replacement of the advertisement must be with advertisements from the same advertiser. In contrast, row 409 indicates that the play out system will cause after a second sixty second advertisement to be played after the advertisement indicated by row 407, and that the second advertisement should be replaced with an advertisement from a different advertiser if it is replaced.

FIG. 4B is a table diagram of a fourth resultant stream 450 generated based on the second augmented playlist 400, according to various embodiments described herein. The fourth resultant stream 450 may be generated in a similar manner to the resultant stream 340, and the content column 451 and metadata column 453 may be similar to the content column 341 and metadata column 343 described above in connection with FIG. 3C. The fourth resultant stream 450 may be generated by an augmentation system, such as the augmentation system 102 described above in connection with FIG. 1, an addressable play out provider, such as the addressable play out provider 116 described above in connection with FIG. 1, a broadcast play out provider, such as the broadcast play out provider 114 described above in connection with FIG. 1, any other entity with access to the second augmented playlist 400, or some combination thereof.

The fourth resultant stream 450 includes rows 455, 457, 459, and 461, of which rows 455 and 461 are similar to rows 405 and 411 described above in connection with the second augmented playlist 400. Row 457 indicates that an addressable play out provider, such as the addressable play out provider 116 described above in connection with FIG. 1, will cause "Advertisement 3" to be streamed after the "Newscast." Row 457 further indicates that "Advertisement 3" is a different advertisement than "Advertisement 1" specified in row 407 of the augmented playlist 400, but has the same advertiser, as required by the metadata specified in the metadata column 453 and 403. Row 459 indicates that an addressable playout provider will cause "Advertisement 4" to be streamed after "Advertisement 3," and that "Advertisement 4" is associated with a different advertiser than "Advertisement 2" which is included in the corresponding slot indicated by row 409 of the augmented playlist 400.

Figure 5:
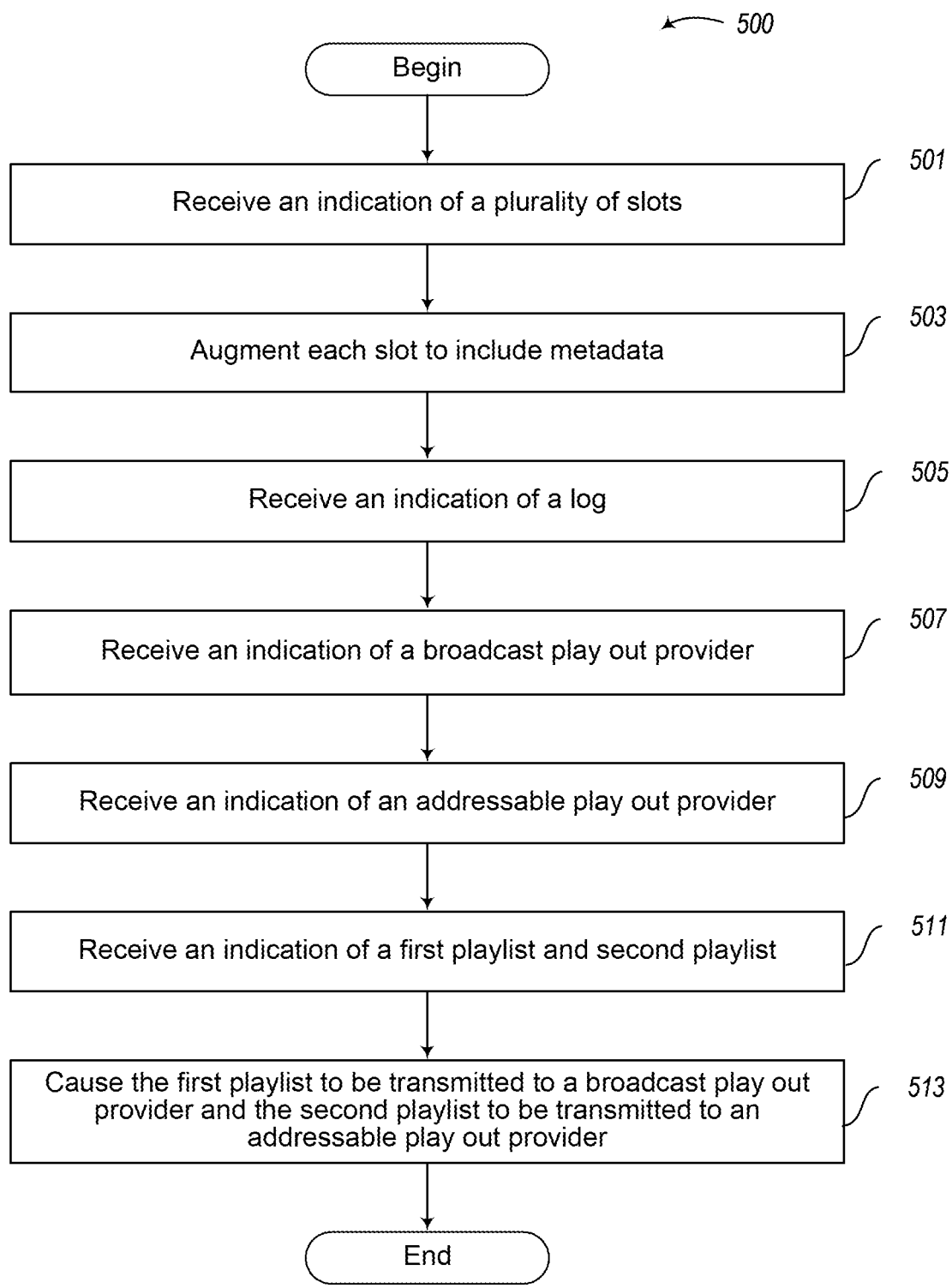
FIG. 5 is a flow diagram of a process for generating playlists based on a log, according to various embodiments described herein.

FIG. 5 is a flow diagram of a process 500 for generating playlists based on a log, according to various embodiments described herein. Although the acts included in the process 500 are described as being performed by an augmentation system, embodiments are not so limited and at least some of the acts included in the process 500 may be performed by one or more of: an augmentation system, such as the augmentation system 102, a broadcast play out provider, such as the broadcast play out provider 114, an addressable play out provider, such as the addressable play out provider 116, or some combination thereof. The process 500 begins, after a start block, at act 501, where the augmentation system receives an indication of a plurality of slots. In some embodiments, the indication of the plurality slots is received from one or more buyers or sellers, such as the buyers 112 or sellers 104 described above in connection with FIG. 1. In some embodiments, the indication of the plurality of slots is generated based on the results of an advertisement auction in which the participants include the buyers 112 and sellers 104.

The process 500 proceeds to act 503, where the augmentation system augments each slot of the plurality of slots to include metadata. In some embodiments, the metadata assigned to each slot is similar to the slot metadata 205 described above in connection with FIG. 2. In some embodiments, the augmentation system augments a portion of the plurality of slots, instead of each slot of the plurality of slots.

The process 500 proceeds to act 505, where the augmentation system receives an indication of a log. In some embodiments, at act 505, the augmentation system generates the log based on the augmented slots and the indication of the plurality of slots.

The process 500 proceeds to act 507, where the augmentation system receives an indication of a broadcast play out provider, such as the broadcast play out provider 114 described above in connection with FIG. 1.

The process 500 proceeds to act 509, where the augmentation system receives an indication of an addressable play out provider, such as the addressable play out provider 116 described above in connection with FIG. 1.

The process 500 proceeds to act 511, where the augmentation system receives an indication of a first playlist and a second playlist. In some embodiments, at act 511, the augmentation system generates one or more of the first playlist and the second playlist based on the log and the augmented slots. In some embodiments, the second playlist is generated based on the first playlist. In some embodiments, a broadcast play out provider or an addressable play out provider generates the second playlist based on the first playlist. In some embodiments, act 511 is optional, and the augmentation system provides the log to the broadcast play out provider which generates at least the first playlist.

The process 500 proceeds to act 513, where the augmentation system causes the first playlist to be transmitted to the broadcast play out provider and causes the second playlist to be transmitted to the addressable play out provider. In some embodiments, the augmentation system causes the playlists to be transmitted to the play out providers by providing a log to the broadcast play out provider. In such embodiments, the augmentation system may cause the broadcast play out provider to generate at least the first playlist and the addressable play out provider generate a stream based on the second playlist. In some embodiments, the augmentation system causes a playlist to be transmitted to a play out provider transmitting an indication of the playlist to a computing system associated with the play out provider. In some embodiments, a play out provider uses a playlist to determine the order in which content is to be provided to a viewer via the stream.

In an exemplary embodiment, at acts 511 and 513, the augmentation system generates the first playlist based on the indication of the log and the augmented slots and generates the second playlist based on at least the augmented slots and one or more of the first playlist and the indication of the log. In this example embodiment, the augmentation system causes the broadcast play out provider to generate a broadcast stream based on the first playlist and causes the addressable play out provider to generate a digital, or "addressable," stream based on the second play list.

In another exemplary embodiment, at acts 511 and 513 the augmentation system generates a first playlist based on at least one of the indication of the log and the augmented slots. In this example embodiment, the augmentation system causes the broadcast play out provider to generate the broadcast stream based on the first playlist and to cause the addressable play out provider to generate the addressable stream based on the second playlist. In some embodiments, to cause the addressable play out provider to generate the addressable stream based on the second playlist, the broadcast play out provider causes an indication of the first playlist to be transmitted to the addressable play out provider and the addressable play out provider generates the second playlist. In some embodiments, to cause the addressable play out provider to generate the addressable stream based on the second playlist, the broadcast play out provider generates the second playlist and causes the second playlist to be transmitted to the addressable play out provider.

In both of these example embodiments, generating the log and generating playlists based on the augmented slots and log improves the functioning of the computing systems of the addressable play out provider and broadcast play out providers by ensuring that the entire log does not need to be sent to at least the addressable play out provider, thus conserving networking and other computing resources, such as networking bandwidth, memory, data storage capacity, and processing power of the computing system of the addressable play out provider and the broadcast play out provider. Furthermore, the metadata included in the second playlist improves functioning of addressable play out provider computing systems by providing further functionality to the computing systems of the addressable play out provider such as allowing these computing systems to identify content included in a broadcast stream that can be replaced with other content in a resultant addressable stream. For example, by identifying metadata used to augment slots in a playlist received by the addressable play out provider, the addressable play out provider is able to replace, alter, or otherwise manipulate the content indicated by the augmented slots to be different content than the content provided to viewers in the broadcast stream.

After act 513, the process 500 ends.

Figure 6:
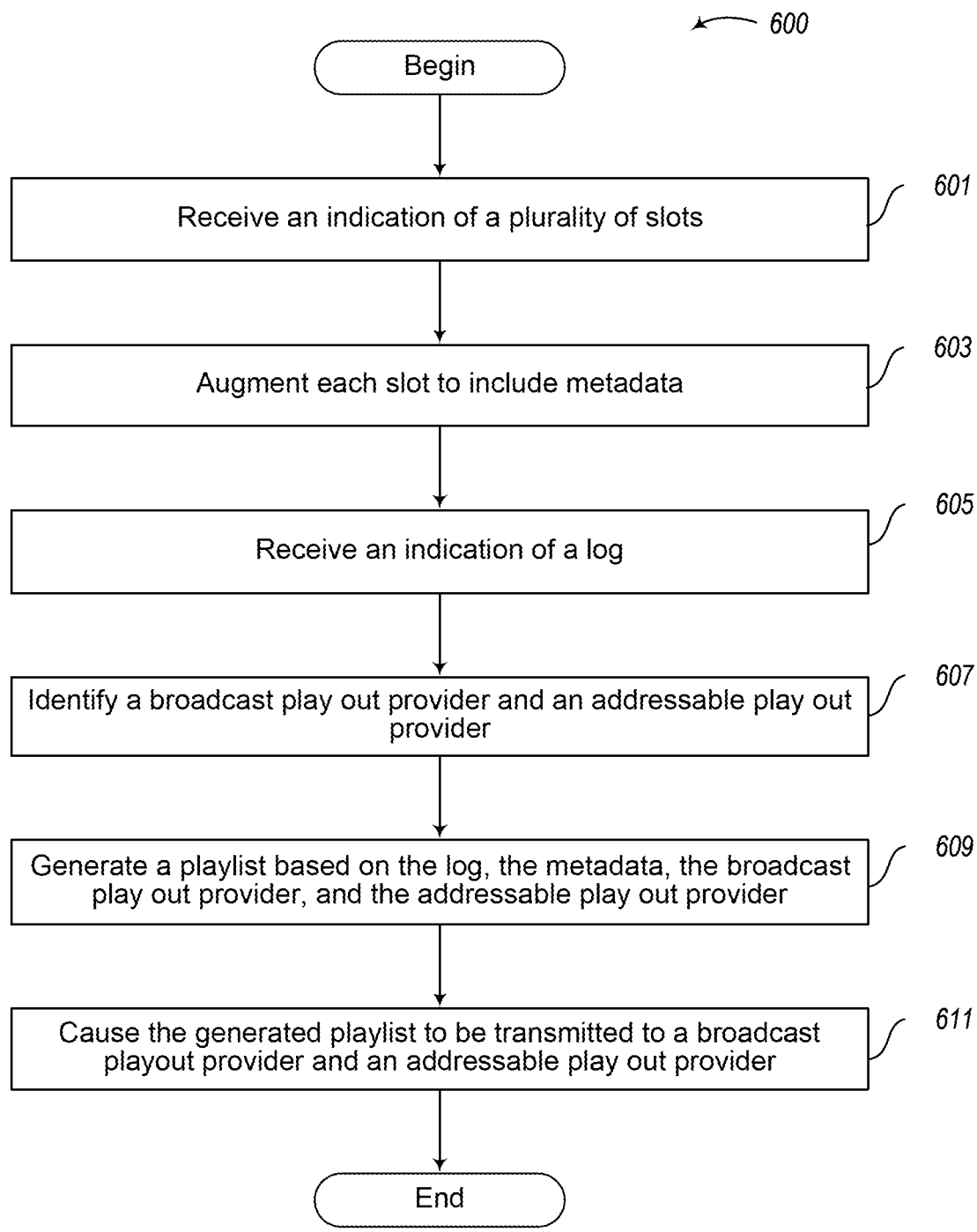
FIG. 6 is a flow diagram of a process for sending a playlist to one or more streams, according to various embodiments described herein.

FIG. 6 is a flow diagram of a process 600 for sending a playlist to one or more streams, according to various embodiments described herein. Although the acts included in the process 600 are described as being performed by an augmentation system, embodiments are not so limited and at least some of the acts included in the process 600 may be performed by one or more of: an augmentation system, such as the augmentation system 102, a broadcast play out provider, such as the broadcast play out provider 114, an addressable play out provider, such as the addressable play out provider 116, or some combination thereof. The process 600 begins, after a start block, at act 601, where the augmentation system receives an indication of a plurality of slots. In some embodiments, act 601 is performed in a similar manner to act 501, described above in connection with FIG. 5.

The process 600 proceeds to act 603, where the augmentation system augments each slot of the plurality of slots to include metadata. In some embodiments, act 603 is performed in a similar manner to act 503, described above in connection with FIG. 5.

The process 600 proceeds to act 605, where the augmentation system receives an indication of a log. In some embodiments, act 605 is performed in a similar manner to act 505, described above in connection with FIG. 5.

The process 600 proceeds to act 607, where the augmentation system identifies a broadcast play out provider and an addressable play out provider. In some embodiments, act 607 is performed in a similar manner to acts 507 and 509, described above in connection with FIG. 5.

The process 600 proceeds to act 609, where the augmentation system generates a playlist based on the log, the metadata, the broadcast play out provider, and the addressable play out provider. In some embodiments, the playlist is similar to one or more of the broadcast playlist 300, the augmented playlist 320, and the augmented playlist 400 described above in connection with FIGS. 3A, 3B, and 4A respectively.

The process 600 proceeds to act 611, where the augmentation system causes the generated playlist to be transmitted to a broadcast play out provider associated with the broadcast stream and an addressable play out provider associated with the addressable stream.

After act 611, the process 600 ends.

Figure 7:
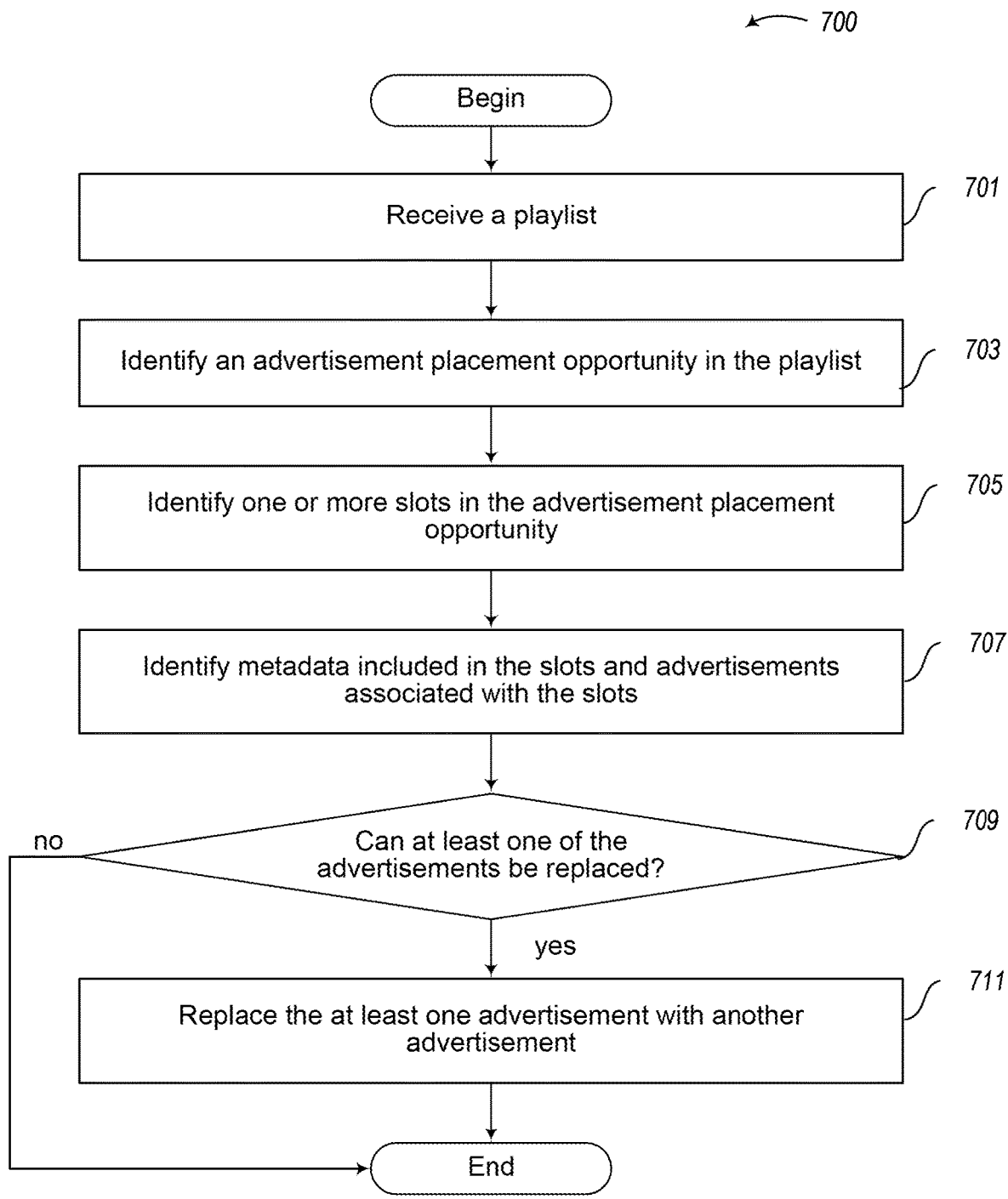
FIG. 7 is a flow diagram of a process for replacing advertisements assigned to slots based on metadata associated with the slots, according to various embodiments described herein.

FIG. 7 is a flow diagram of a process 700 for replacing advertisements assigned to slots based on metadata associated with the slots, according to various embodiments described herein. Although the process 700 is described as being performed by an addressable play out provider, embodiments are not so limited and at least some of the acts included in the process 700 may be performed by one or more of: an augmentation system, such as the augmentation system 102, a broadcast play out provider, such as the broadcast play out provider 114, an addressable play out provider, such as the addressable play out provider 116, or some combination thereof. The process 700 begins, after a start block, at act 701 where the addressable play out provider receives a playlist. In some embodiments, the received playlist is similar to one or more of the broadcast playlist 300, the augmented playlist 320, and the augmented playlist 400 described above in connection with FIGS. 3A, 3B, and 4A respectively.

The process 700 proceeds to act 703, where the addressable play out provider identifies an advertisement placement opportunity including one or more augmented slots in the playlist.

The process 700 proceeds to act 705, where the addressable play out provider identifies one or more slots in the advertisement placement opportunity.

The process 700 proceeds to act 707, where the addressable play out provider identifies metadata associated with the one or more slots and identifies one or more advertisements associated with the one or more slots.

The process proceeds to act 709, where the addressable play out provider determines whether at least one advertisement of the one or more advertisements can be replaced based on metadata included in a slot associated with the at least one advertisement. For example, if the metadata indicates that the advertisement cannot be replaced, the addressable play out provider determines that the advertisement cannot be replaced. In another example, if the metadata indicates that the advertisement is permitted to be replaced or must be replaced, the addressable play out provider determines that the advertisement can be replaced. Furthermore, in some embodiments, the addressable play out provider may determine that one or more slots associated with advertisements that can be replaced can be altered, such as to combine the slots into one slot or to split a plurality of slots to create additional smaller slots. For example, the addressable play out provider may split two slots representing thirty seconds of time into three smaller slots that each represent ten seconds of time, where two of the slots represent five seconds of time and one of the slots represents twenty seconds of time, etc.

If the addressable play out provider determines that none of the advertisements can be replaced, the process 700 ends, otherwise, the process 700 continues to act 711. At act 711, the addressable play out provider replaces at least one advertisement with at least one other advertisement. In some embodiments, replacing at least one advertisement with at least one other advertisement includes obtaining or otherwise receiving the advertisement content associated with the at least one other advertisement and inserting that advertisement content into a stream generated by the addressable play out system.

After act 711, the process 700 ends.

Figure 8:
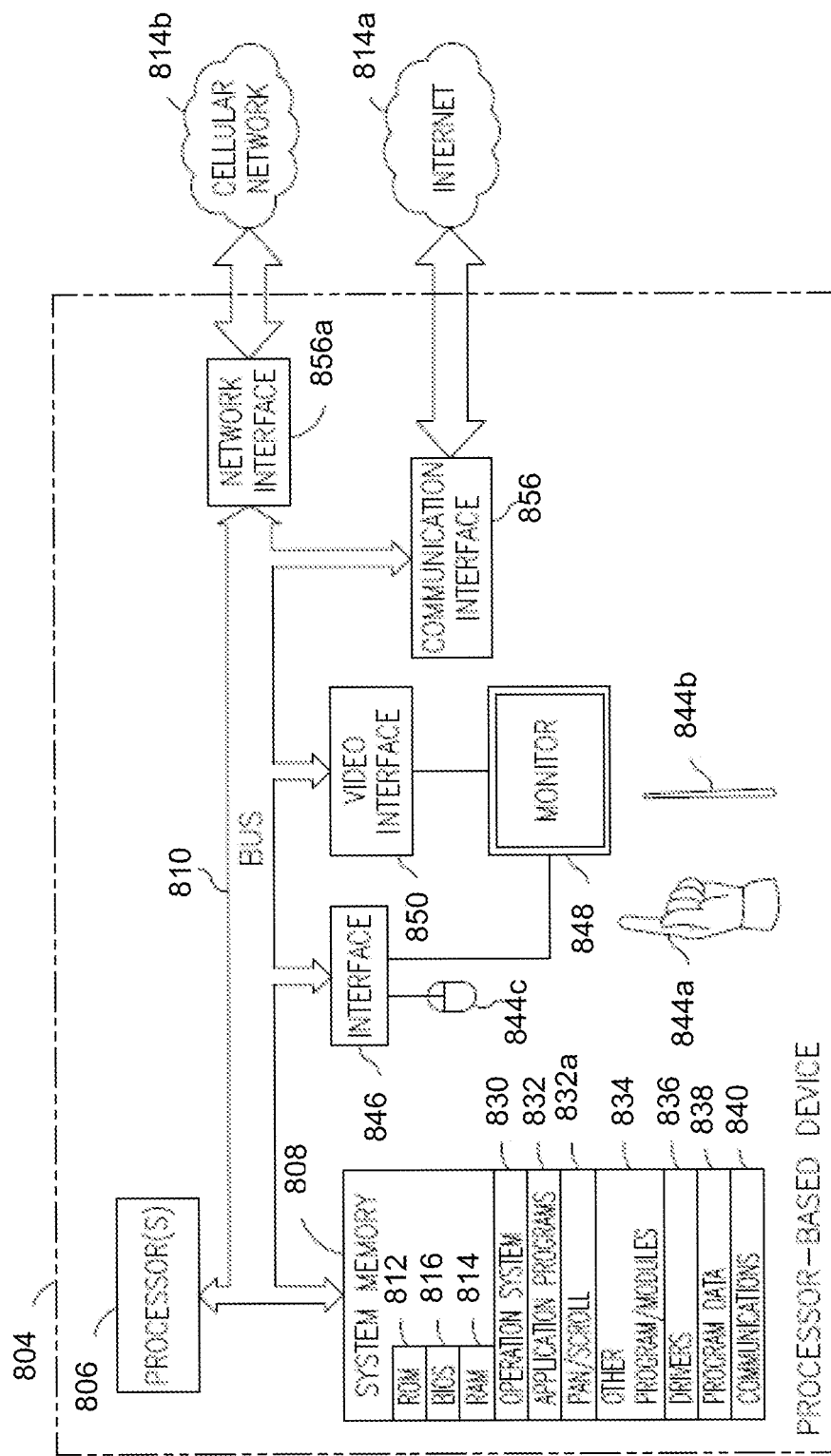
FIG. 8 shows a processor-based device suitable for implementing the various functionality described herein.

FIG. 8 shows a processor-based device 804 suitable for implementing the various functionality described herein. Although not required, some portion of the implementations will be described in the general context of processor-executable instructions or logic, such as program application modules, objects, or macros being executed by one or more processors. Those skilled in the relevant art will appreciate that the described implementations, as well as other implementations, can be practiced with various processor-based system configurations, including handheld devices, such as smartphones and tablet computers, wearable devices, multiprocessor systems, microprocessor-based or programmable consumer electronics, personal computers ("PCs"), network PCs, minicomputers, mainframe computers, and the like.

The processor-based device 804 may include one or more processors 806, a system memory 808 and a system bus 810 that couples various system components including the system memory 808 to the processor(s) 806. The processor-based device 804 will at times be referred to in the singular herein, but this is not intended to limit the implementations to a single system, since in certain implementations, there will be more than one system or other networked computing device involved. Non-limiting examples of commercially available systems include, but are not limited to, ARM processors from a variety of manufactures, Core microprocessors from Intel Corporation, U.S.A., PowerPC microprocessor from IBM, Sparc microprocessors from Sun Microsystems, Inc., PA-RISC series microprocessors from Hewlett-Packard Company, 68xxx series microprocessors from Motorola Corporation.

The processor(s) 806 may be any logic processing unit, such as one or more central processing units (CPUs), microprocessors, digital signal processors (DSPs), application-specific integrated circuits (ASICs), field programmable gate arrays (FPGAs), etc. Unless described otherwise, the construction and operation of the various blocks shown in FIG. 8 are of conventional design. As a result, such blocks need not be described in further detail herein, as they will be understood by those skilled in the relevant art.

The system bus 810 can employ any known bus structures or architectures, including a memory bus with memory controller, a peripheral bus, and a local bus. The system memory 808 includes read-only memory ("ROM") 812 and random access memory ("RAM") 814. A basic input/output system ("BIOS") 816, which can form part of the ROM 812, contains basic routines that help transfer information between elements within processor-based device 804, such as during start-up. Some implementations may employ separate buses for data, instructions and power.

The processor-based device 804 may also include one or more solid state memories, for instance Flash memory or solid state drive (SSD) 818, which provides nonvolatile storage of computer-readable instructions, data structures, program modules and other data for the processor-based device 804. Although not depicted, the processor-based device 804 can employ other nontransitory computer-or processor-readable media, for example a hard disk drive, an optical disk drive, or memory card media drive.

Program modules can be stored in the system memory 808, such as an operating system 830. one or more application programs 832, other programs or modules 834, drivers 836 and program data 838.

The application programs 832 may, for example, include panning/scrolling 832a. Such panning/scrolling logic may include, but is not limited to logic that determines when and/or where a pointer (e.g., finger, stylus, cursor) enters a user interface element that includes a region having a central portion and at least one margin. Such panning/scrolling logic may include, but is not limited to logic that determines a direction and a rate at which at least one element of the user interface element should appear to move, and causes updating of a display to cause the at least one element to appear to move in the determined direction at the determined rate. The panning/scrolling logic 832a may, for example, be stored as one or more executable instructions. The panning/scrolling logic 832a may include processor and/or machine executable logic or instructions to generate user interface objects using data that characterizes movement of a pointer, for example data from a touch-sensitive display or from a computer mouse or trackball, or other user interface device.

The system memory 808 may also include communications programs 840, for example a server and/or a Web client or browser for permitting the processor-based device 804 to access and exchange data with other systems such as user computing systems, Web sites on the Internet, corporate intranets, or other networks as described below. The communications programs 840 in the depicted implementation may be markup language based, such as Hypertext Markup Language (HTML), Extensible Markup Language (XML) or Wireless Markup Language (WML), and operates with markup languages that use syntactically delimited characters added to the data of a document to represent the structure of the document. A number of servers and/or Web clients or browsers are commercially available such as those from Mozilla Corporation of California and Microsoft of Washington.

While shown in FIG. 8 as being stored in the system memory 808, the operating system 830, application programs 832, other programs/modules 834, drivers 836, program data 838 and server and/or browser 840 can be stored on any other of a large variety of nontransitory processor-readable media (e.g., hard disk drive, optical disk drive, SSD and/or flash memory).

A user can enter commands and information via a pointer, for example through input devices such as a touch screen 848 via a finger 844a, stylus 844b, or via a computer mouse or trackball 844c which controls a cursor. Other input devices can include a microphone, joystick, game pad, tablet, scanner, biometric scanning device, etc. These and other input devices (i.e., "I/O devices") are connected to the processor(s) 806 through an interface 846 such as touch-screen controller and/or a universal serial bus ("USB") interface that couples user input to the system bus 810, although other interfaces such as a parallel port, a game port or a wireless interface or a serial port may be used. The touch screen 848 can be coupled to the system bus 810 via a video interface 850, such as a video adapter to receive image data or image information for display via the touch screen 848. Although not shown, the processor-based device 804 can include other output devices, such as speakers, vibrator, haptic actuator, etc.

The processor-based device 804 may operate in a networked environment using one or more of the logical connections to communicate with one or more remote computers, servers and/or devices via one or more communications channels, for example, one or more networks 814a, 814b. These logical connections may facilitate any known method of permitting computers to communicate, such as through one or more LANs and/or WANs, such as the Internet, and/or cellular communications networks. Such networking environments are well known in wired and wireless enterprise-wide computer networks, intranets, extranets, the Internet, and other types of communication networks including telecommunications networks, cellular networks, paging networks, and other mobile networks.

When used in a networking environment, the processor-based device 804 may include one or more wired or wireless communications interfaces 814a, 814b (e.g., cellular radios, WI-FI radios, Bluetooth radios) for establishing communications over the network, for instance the Internet 814a or cellular network.

In a networked environment, program modules, application programs, or data, or portions thereof, can be stored in a server computing system (not shown). Those skilled in the relevant art will recognize that the network connections shown in FIG. 8 are only some examples of ways of establishing communications between computers, and other connections may be used, including wirelessly.

For convenience, the processor(s) 806, system memory 808, network and communications interfaces 814a, 814b are illustrated as communicably coupled to each other via the system bus 810. thereby providing connectivity between the above-described components. In alternative implementations of the processor-based device 804, the above-described components may be communicably coupled in a different manner than illustrated in FIG. 8. For example, one or more of the above-described components may be directly coupled to other components, or may be coupled to each other, via intermediary components (not shown). In some implementations, system bus 810 is omitted and the components are coupled directly to each other using suitable connections.

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one implementation, the present subject matter may be implemented via Application Specific Integrated Circuits (ASICs). However, those skilled in the art will recognize that the implementations disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative implementation applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of operating a computer system, comprising:
   receiving an indication of a plurality of slots offered by a media content provider, each slot being associated with an advertisement placement opportunity of a plurality of advertisement placement opportunities and each slot being assigned at least one advertisement;
   augmenting each slot of the plurality of slots to include metadata;
   receiving an indication of a log, the log indicating media content provided by the media content provider and at least one advertisement placement opportunity of the plurality of advertisement placement opportunities;
   receiving an indication of a first playlist and a second playlist, each playlist including a subset of the plurality of slots;
   causing a broadcast stream to be generated by a broadcast play out provider based on the first playlist; and causing an addressable stream to be generated by an addressable play out provider based on the second playlist, such that, to generate the addressable stream, the addressable play out provider is able to:
use the second playlist to identify additional metadata in the second playlist for a first slot of the plurality of slots,
identify a first advertisement assigned to the first slot of the plurality of slots,
determine whether the first advertisement is permitted to be replaced based on the additional metadata, and
based on the determining: combine the first slot of the plurality of slots with a second slot to which a second advertisement is assigned, and replace the first advertisement and the second advertisement with a third advertisement.

2. The method of claim 1, wherein the first playlist and the second playlist include at least one common advertisement placement opportunity, and
wherein the at least one common advertisement placement opportunity is included at the same position in the first playlist and the second playlist.

3. The method of claim 1, wherein at least a subset of the broadcast stream and at least a subset of the addressable stream include the same media content.

4. The method of claim 1, wherein the metadata for each respective slot of the plurality of slots includes one or more of:
an indication of whether an advertisement assigned to the respective slot must be included in the addressable stream;
an indication of whether an advertisement assigned to the respective slot is permitted to be included in the addressable stream; or
an indication of whether an advertisement assigned to the respective slot must not be included in the addressable stream.

5. The method of claim 1, further comprising:
generating the first playlist for a broadcast stream based on the log, the subset of the plurality of slots, and the metadata associated with each slot of the subset of the plurality of slots; and
generating the second playlist for an addressable stream based on the log, the subset of the plurality of slots, and the metadata associated with each slot of the subset of the plurality of slots.

6. The method of claim 1, wherein causing the broadcast stream to be generated further comprises causing the first playlist to be transmitted to the broadcast play out provider, and
wherein causing the addressable stream to be generated further comprises causing the second playlist to be transmitted to the addressable play out provider.

7. The method of claim 2, wherein the at least one common advertisement placement opportunity has the same duration in the broadcast stream and the addressable stream.

8. The method of claim 2, wherein the at least one common advertisement placement opportunity includes a different number of slots in the broadcast stream than in the addressable stream.

9. The method of claim 4, wherein the metadata includes an indication that the advertisement assigned to the respective slot is permitted to be included in the addressable stream and the metadata further includes one or more of:
an indication of a cost of the respective slot;
an identifier for the advertisement assigned to the slot;
an indication of an advertiser associated with the advertisement;
an indication of a creative for the advertisement assigned to the slot;
an indication of a category of the advertisement assigned to the slot; or
an indication of length of the advertisement assigned to the slot.

10. The method of claim 4, wherein the metadata includes an indication that the advertisement assigned to the respective slot must be replaced in the addressable stream and the metadata further includes:
an indication of an advertiser associated with the advertisement; and
an indication of whether the advertisement must be replaced by another advertisement associated with the advertiser.

11. A system comprising:
at least one processor; and
at least one memory coupled to the at least one processor, the at least one memory having computer-executable instructions stored thereon that, when executed by the at least one processor, cause the system to:
receive an indication of a plurality of slots offered by a media content provider, each slot being associated with an advertisement placement opportunity of a plurality of advertisement placement opportunities and each slot being assigned at least one advertisement;
augment each slot of the plurality of slots to include metadata;
receive a log, the log indicating media content provided by the media content provider and at least one advertisement placement opportunity of the plurality of advertisement placement opportunities;
receive an indication of a broadcast play out provider;
receive an indication of an addressable play out provider;
receive an indication of a first playlist and a second playlist, each playlist including a subset of the plurality of slots;
cause a broadcast stream to be generated by the broadcast play out provider based on the first playlist; and
cause an addressable stream to be generated by the addressable play out provider based on the second playlist, such that, to generate the addressable stream, the addressable play out provider is able to:
use the second playlist to identify additional metadata in the second playlist for a first slot of the plurality of slots,
identify a first advertisement assigned to the first slot of the plurality of slots,
determine whether the first advertisement is permitted to be replaced based on the additional metadata, and
based on the determining: combine the first slot of the plurality of slots with a second slot to which a second advertisement is assigned, and replace the first advertisement and the second advertisement with a third advertisement.

12. A non-transitory processor-readable storage medium that stores at least one of instructions or data, the instructions or data, when executed by at least one processor, cause the at least one processor to:

receive an indication of a plurality of slots offered by a media content provider, each slot being associated with an advertisement placement opportunity of a plurality of advertisement placement opportunities and each slot being assigned at least one advertisement;

augment each slot of the plurality of slots to include metadata;

receive a log, the log indicating media content provided by the media content provider and at least one advertisement placement opportunity of the plurality of advertisement placement opportunities;

receive an indication of a broadcast play out provider;

receive an indication of an addressable play out provider;

receive an indication of a first playlist and a second playlist, each playlist including a subset of the plurality of slots;

cause the first playlist to be transmitted to a broadcast play out provider, the broadcast play out provider being able to generate a broadcast stream based on the first playlist; and cause the second playlist to be transmitted to an addressable play out provider, the addressable play out provider being able to generate an addressable stream based on the second playlist, such that, to generate the addressable stream, the addressable play out provider is able to:

use the second playlist to identify additional metadata in the second playlist for a first slot of the plurality of slots, identify a first advertisement assigned to the first slot of the plurality of slots, determine whether the first advertisement is permitted to be replaced based on the additional metadata, and based on the determining: combine the first slot of the plurality of slots with a second slot to which a second advertisement is assigned, and replace the first advertisement and the second advertisement with a third advertisement.

13. A method of operating a computer system, comprising:

receiving a playlist, the playlist including an indication of media content and an indication of a plurality of advertisement placement opportunities; and for each respective advertisement placement opportunity of the plurality of advertisement opportunities:

identifying one or more slots included in the plurality of advertisement placement opportunities; and for each respective slot of the one or more slots:

identifying metadata included in the playlist for the respective slot;

identifying a first advertisement assigned to the respective slot;

determining whether the first advertisement is permitted to be replaced based on the metadata; and based on the determining, replacing the first advertisement with another advertisement by:

identifying additional metadata included in the playlist for a second slot of the one or more slots;

identifying a second advertisement assigned to the second slot;

determining whether the second advertisement is permitted to be replaced based on the additional metadata; and based on the determining:

combining the respective slot and the second slot; and replacing the first advertisement and the second advertisement with a third advertisement.

14. The method of claim 13, wherein the metadata included in the playlist for each respective slot comprises one or more of:

an indication that the first advertisement assigned to the respective slot must be replaced with a second advertisement;

an indication that the first advertisement assigned to the respective slot must not be replaced with a second advertisement; or an indication that the first advertisement assigned to the respective slot is permitted to be replaced with a second advertisement.

15. The method of claim 13, wherein replacing the first advertisement further comprises:

splitting the respective slot into two or more slots; and assigning an advertisement to each slot of the two or more slots.

16. The method of claim 13, wherein replacing the first advertisement further comprises:

identifying additional metadata included in the playlist for the respective slot; and replacing the first advertisement with another advertisement based on the additional metadata.

17. The method of claim 13, wherein the method further comprises:

causing a stream to be transmitted to one or more devices based on the received playlist; and wherein replacing the first advertisement with another advertisement comprises replacing the first advertisement with another advertisement in real-time in conjunction with the transmission of the stream.

18. The method of claim 14, wherein the metadata included in the playlist for each respective slot further comprises one or more of:

an indication of a rate for the first advertisement assigned to the respective slot;

an indication of a length of the respective slot;

an indication of a creative associated with the first advertisement assigned to the respective slot; or an indication of a category of the first advertisement assigned to the respective slot.

19. The method of claim 16, wherein the additional metadata comprises one or more of:

an indication of whether the advertisement must be replaced by another advertisement associated with the advertiser associated with the advertisement; or an indication of whether the advertisement must not be replaced by another advertisement associated with the advertiser associated with the advertisement.

* * * * *